Patented Feb. 23, 1926.

1,574,252

UNITED STATES PATENT OFFICE.

CARL MARCZINCZEK, OF OAKLAND, CALIFORNIA.

METHOD OF MAKING LIGHT, POROUS WALLS.

No Drawing. Application filed June 1, 1925. Serial No. 34,176.

*To all whom it may concern:*

Be it known that I, CARL MARCZINCZEK, a citizen of the United States, residing at Oakland, in the county of Alameda and State of California, have invented certain new and useful Improvements in Methods of Making Light, Porous Walls, of which the following is a specification.

My invention comprises a method of making light, porous walls which have good heat and sound insulating properties, as well as sufficient strength for most inside walls of a building. My invention also comprehends the composition of matter used in forming a wall.

An object of my invention is to make use in building structures of volcanic materials which in some parts of the world can be readily obtained very cheaply. These materials are mostly of a light and porous nature and can be mixed with other ingredients which will set to form a homogeneous wall structure.

As an illustration of suitable volcanic materials, I may use volcanic ash and pumice stone. The latter may be broken in coarse or fine particles, and for walls in which a smooth surface finish is desired, should be made of pulverized pumice stone. If the volcanic ash is not sufficiently fine it should be crushed. As an illustration of a suitable composition I may utilize volcanic ash to the extent of 40% by bulk, pumice stone 20%, fine lime, such as is designated "a hard-wall finish" and plaster of Paris, 20%. Sufficient water is used to blend the mixture and the quantity slightly in excess of that required to set the plaster of Paris and lime, is used.

My process of mixing and making the wall material comprises intimately mixing the volcanic ash and pumice stone, using, as above mentioned, either coarse or fine crushed or pulverized pumice stone and a crushed volcanic ash. The lime and the plaster of Paris are thoroughly mixed together. Thirdly the two batches of ingredients are incorporated and mixed together. If these are quite dry they may be stored in this mixture to be sold and used as required, or else the mixture can be made up as desired for use.

The combined mixture has sufficient water mixed therewith to form the type of finished wall desired. If poured into molds it is desirable to have considerable excess of water over that required to set the plaster of Paris and lime in order to fill the voids. The porous pumice stone and volcanic ash will absorb considerable water. If the composition is to be used as a stucco or wall plaster, it is desirable to use only sufficient water to give a smooth flowing mixture and to prevent the plaster of Paris from setting too rapidly.

Having described my invention, what I claim is:—

A wall material comprising a mixture substantially in the following proportions by bulk: volcanic ash forty per cent, pumice stone twenty per cent, lime (such as commonly designated as "hard wall finish"), twenty per cent, plaster of Paris twenty per cent, the whole being intimately mixed.

In testimony whereof I affix my signature.

CARL MARCZINCZEK.